(12) United States Patent
Li et al.

(10) Patent No.: US 11,900,908 B2
(45) Date of Patent: Feb. 13, 2024

(54) WHEEL WITH A SOUND ABSORBING DEVICE

(71) Applicant: CITIC Dicastal Co., Ltd, Qinhuangdao (CN)

(72) Inventors: Xi Li, Qinhuangdao (CN); Zuo Xu, Qinhuangdao (CN); Zhihua Zhu, Qinhuangdao (CN); Shiwen Xu, Qinhuangdao (CN); Shide Li, Qinhuangdao (CN); Shaobing Huang, Qinhuangdao (CN); Mingbo Chen, Qinhuangdao (CN); Minglei Li, Qinhuangdao (CN)

(73) Assignee: CITIC Dicastal Co., Ltd, Qinhuangdao (CN)

( * ) Notice: Subject to any disclaimer, the term of this patent is extended or adjusted under 35 U.S.C. 154(b) by 317 days.

(21) Appl. No.: 17/170,828

(22) Filed: Feb. 8, 2021

(65) Prior Publication Data
US 2022/0148553 A1 May 12, 2022

(30) Foreign Application Priority Data
Nov. 11, 2020 (CN) .......................... 202011251298.5

(51) Int. Cl.
*G10K 11/172* (2006.01)
*B60B 21/12* (2006.01)
(Continued)

(52) U.S. Cl.
CPC ............ *G10K 11/172* (2013.01); *B33Y 80/00* (2014.12); *B60B 21/12* (2013.01); *G10K 11/162* (2013.01)

(58) Field of Classification Search
CPC .............................. G10K 11/172; B60B 21/12
See application file for complete search history.

(56) References Cited

U.S. PATENT DOCUMENTS 9,399,372 B2 * 7/2016 Kamiyama ............. B60B 21/12
10,131,184 B2 * 11/2018 Mohan .................... B60B 25/22
(Continued)

FOREIGN PATENT DOCUMENTS

| CN | 110808022 A | 2/2020 |
| CN | 211764672 U | 10/2020 |

(Continued)

OTHER PUBLICATIONS

English translation of JP2015067051 A, accessed Feb. 9, 2023 via USPTO Search Tool (Year: 2015).*
(Continued)

*Primary Examiner* — Jeremy A Luks
(74) *Attorney, Agent, or Firm* — Yong Chen

(57) ABSTRACT

The application relates to a wheel with a sound absorption device, wherein the sound absorption device is arranged in a wheel air chamber to reduce acoustic resonance, the sound absorption device comprises two resonance sound absorption structure units which are connected in parallel, a first sound absorption frequency band of a first resonance sound absorption structure unit and a second sound absorption frequency band of a second resonance sound absorption structure unit are adjacent to each other or partially overlap with each other, and the resonance frequency of the wheel air chamber is contained at the adjacent part of the first sound absorption frequency band and the second sound absorption frequency band or in the overlapping area of the first sound absorption frequency band and the second sound absorption frequency band.

9 Claims, 2 Drawing Sheets

(51) Int. Cl.
*B33Y 80/00* (2015.01)
*G10K 11/162* (2006.01)

(56) References Cited

U.S. PATENT DOCUMENTS

| | | | | |
|---|---|---|---|---|
| 2015/0321509 A1* | 11/2015 | Kamiyama | ........... | B60B 21/025 |
| | | | | 301/95.101 |
| 2018/0029425 A1* | 2/2018 | Nourzad | ............... | B60C 19/002 |
| 2018/0345722 A1* | 12/2018 | Kim | ........................ | B60B 25/22 |
| 2019/0160866 A1* | 5/2019 | Miura | .................... | B60C 19/002 |
| 2019/0275847 A1* | 9/2019 | Nishi | ....................... | B60B 21/12 |
| 2020/0316988 A1* | 10/2020 | Seung | .................... | B60C 19/002 |
| 2021/0138849 A1* | 5/2021 | Xu | ........................ | B60C 19/002 |

FOREIGN PATENT DOCUMENTS

| | | | |
|---|---|---|---|
| EP | 2783879 | A1 | 10/2014 |
| EP | 2933119 | A1 | 10/2015 |
| GB | 2536034 | A | 9/2016 |
| JP | H06106903 | A | 4/1994 |
| JP | 2015067051 | A | 4/2015 |

OTHER PUBLICATIONS

European Search Report for the corresponding EP application No. EP21156442, dated Jun. 19, 2021, 9 pages total.
First Office Action for the corresponding CN application No. CN202022599451.5, dated Sep. 14, 2021, 2 pages total.

\* cited by examiner

WHEEL WITH A SOUND ABSORBING DEVICE

CROSS-REFERENCE TO RELATED APPLICATIONS

The present application claims the priority of Chinese patent application No. 202011251298.5, filed on Nov. 11, 2020, which is hereby incorporated by reference in its entirety.

TECHNICAL FIELD

The present disclosure relates to a wheel with a sound absorbing device, in particular a vehicle wheel with pneumatic tyre.

BACKGROUND

During normal driving of the vehicle, excitation of the wheels by the road surface and excitation of the wheels by the wheel axles caused by unbalanced rotation of the wheels may both excite acoustic resonances in the air chambers within the wheels, which resonances in turn pass through the wheel axles, the suspension system to the vehicle body, thereby radiating noise into the vehicle. The noise characteristics are mainly the low frequency narrow band and high in magnitude to form noise interference for the interior passenger environment of the vehicle to be effectively controlled.

Currently, there are numerous studies and patents that provide methods to effectively control such acoustic resonances. The approach mainly adopts the principle of sound absorption control, wherein Helmholtz resonance sound absorption is more widely applied and works well. For example, Chinese patents CN101301842B, CN104981359B, CN105209267B, CN104908513B relate to a series of wheel solutions implemented on the basis of Helmholtz resonator noise reduction method. However, in the solutions known from the prior art, the constructional design and mounting structure of the Helmholtz resonator are complicated and are also not ideal in terms of its acoustic absorption effect. In particular, since the states of the four wheels during driving are different, there exists a plurality of narrow-band high-value noises with different distribution characteristics, so that they exhibit a larger noise magnitude over a wider frequency band, which is contradictory to the advantages of Helmholtz narrowband sound absorption. Therefore, structures based on the principle of Helmholtz sound absorption still need to be constantly developed and improved. At the same time, there is room for further improvement in controlling the amplitude and bandwidth based on the diversity of structures of this principle. In addition, the Helmholtz sound absorption principle is also suitable in combination with other noise reduction principles, such as boxed resonance absorption, to compensate for the deficiencies of Helmholtz principle to more effectively improve the efficiency of controlling air chamber resonance, but the fusion of multiple noise reduction principles is not currently popularized for wheel air chamber resonance reduction.

Moreover, in the solutions known from the prior art described above, the construction design and mounting structure of Helmholtz resonators is complex. The resonator part ("secondary air chamber") is configured with a flange-like sheet flange ("rim"). A groove ("groove portion") is formed on a specially configured wall surface on the hub. The positioning and fixing of the resonator part is achieved by the flange-like thin plate flange and the groove portion of the wall surface being engaged with each other. Such snap-in mechanisms, on the one hand, are difficult to guarantee connection strength subject to their thin-walled features, on the other hand, since the realization of the joint cooperation of the two parts is substantially dependent on the structural dimensional accuracy, higher demands are placed on the machining manufacturing of the parts, as well as the laborious installation of the two parts and also the final installation tightening force is not manageable.

Also known from KR101822271B1 is a wheel made of aluminum, on which a resonance tube is mounted along a circumferential surface of the rim, fixed in such a way that the rim has a single sidewall extending in a circumferential direction thereof, the single sidewall being formed with snap-bumps protruding towards the center of the rim. The resonating tube is formed on both sides with one side flange and another side flange; The resonant tube is inserted and hooked onto the snap-in protrusion with the side flange, and the another side flange is provided with screw threads which cooperate with a nut member mating to secure resonant tube onto the circumferential surface of the rim. Such fixing solution of the resonant tube also has the problems such as unreasonable structure, high manufacturing requirements, inconvenience of assembly, and furthermore, the final installation tightening force is still difficult to control.

SUMMARY

The present disclosure is intended to propose a wheel with a sound absorbing device to partially or completely overcome the above-mentioned defects present in the prior art, and in particular to optimize the design of the Helmholtz sound absorbing structure to accommodate the control of acoustic resonances with certain frequency differences of the four wheel air chamber to achieve a noise reduction effect with wider frequency band.

To this end, the disclosure provides a wheel having a sound absorbing device installed in a wheel air chamber to reduce acoustic resonance, wherein the sound absorbing device comprises at least two resonance sound absorbing structure units, wherein the first sound absorbing frequency band of the first resonance sound absorbing structure unit and the second sound absorbing frequency band of the second resonance sound absorbing structure unit are adjacent to each other or partially overlap each other, and the resonance frequency of the wheel air chamber is contained in the adjacent location of the first sound absorbing frequency band and the second sound absorbing frequency band or in the overlapping area of the first sound absorbing frequency band and the second sound absorbing frequency band; the sound absorbing device is constructed as a box body composed of the first resonance sound absorbing structure unit and the second resonance sound absorbing structure unit in parallel, and the box body is fixed on the hub of the wheel. Said sound absorbing device is configured as a box consisting of said first resonance sound absorbing structure unit and second resonance sound absorbing structure unit in parallel, which is fixed to the hub of the wheel.

The solution proposed by the present disclosure is mainly based on the idea that: firstly, two single hole resonant sound absorbing structures is employed, each sound absorbing structure corresponding to a bandwidth of sound absorbing frequencies. Both sound absorption bands are different but close to (or contain) the resonance frequency of the wheel air chamber, and the two sound absorption structures are combined in parallel to absorb sound energy with wider frequency bands, thereby overcoming the defects that the low-frequency sound absorption capacity is difficult to improve and the sound absorption frequency bands are narrow under the limited volume of single Helmholtz resonance sound absorption in the control principle; secondly, the sound absorbing device adopts a rectangular hexahedron-like box structure, in particular made of plastic material, preferably structure resonance frequency thereof is designed to coincide with the resonance frequency of wheel air chamber, thereby enabling a further increase of the sound absorption capacity on the basis of Helmholtz resonance absorption and an extension of the sound absorption band; thirdly, the present disclosure employs two parallel sound absorbing structures (e.g., Single-hole Helmholtz resonators) which are simple in construction and convenient in processing.

According to one embodiment, the sound absorbing device is a rectangular hexahedral box body integrally formed from metal material or plastic material.

According to one embodiment, the sound absorbing device is a rectangular hexahedral box body made by 3D printing process, preferably made of plastic material.

According to the present disclosure, the sound absorbing device is a box configuration. Correspondingly, the sound absorbing device is provided with two side surfaces which define the boundaries of the two ends of the box body in the circumferential direction of the wheel hub, wherein one end forms an open end side surface which is provided with an opening leading into the internal cavity in the box body, and the other end forms a closed end side surface.

In accordance to the present disclosure, the shaping of the sound absorbing device by means of suitable production techniques is ensured with respect to the construction design of the sound absorbing device, while efficiency of controlling air chamber resonance is improved. In accordance to the present disclosure, the sound absorbing structure can be efficiently fabricated by a 3D printing process, facilitating flexible production of box-like sound absorbing devices.

It should be noted that the "rectangular hexahedral" in the present application is not strictly limited to a rectangular hexahedral shape in the geometric sense, but may substantially have a shape similar to a rectangular hexahedral, wherein one or more faces are configured to have a certain arc (e.g., the bottom face of the box body has a circular arc shape adapted to the contour of the outer surface of the rim) and/or to have a localized convex or concave structure (e.g., for mounting or fixation needs), the intersecting faces may not be absolutely orthogonal, and the opposing faces may not be absolutely parallel, without affecting the implementation of the technical solution of the present disclosure.

According to one embodiment, it is beneficial that the first resonance sound absorbing structure unit and the second resonance sound absorbing structure unit of the sound absorbing device respectively form an uniporous Helmholtz resonator, wherein the interior of the box body is divided by a partition plate extending along the circumferential direction of the wheel hub into a first hollow cavity and a second hollow cavity, which are arranged side by side, pipe orifices of a first hollow pipe and a second hollow pipe are formed in the open end side face, the pipe orifices are open toward the wheel air chamber, and the first hollow pipe and the second hollow pipe respectively extend into the first hollow cavity and the second hollow cavity by distances corresponding to the pipe lengths thereof.

As described above, the sound absorption bands of the two sound absorbing structures of the sound absorbing device (i.e., the first resonance sound absorbing structure unit and the second resonance sound absorbing structure unit in parallel) are different, but are both close to (or contain) the resonance frequency of the wheel air chamber. Thus, in particular with respect to the above-described implementation form, the resonance frequencies of the two Helmholtz resonators are not the same, the resonance frequency of the first Helmholtz resonator formed as the first resonance sound absorbing structure unit is greater than or equal to the resonance frequency of the wheel air chamber, and the resonance frequency of the second Helmholtz resonator formed as the second resonance sound absorbing structure unit is less than or equal to the resonance frequency of the wheel air chamber. Suitably, the difference between the resonance frequency of the first Helmholtz resonator and the resonance frequency of the wheel air chamber is not greater than 50% of the resonance frequency of the wheel air chamber; and the difference between the resonance frequency of the second Helmholtz resonator and the resonance frequency of the wheel air chamber is not greater than 50% of the resonance frequency of the wheel air chamber.

Further, structural parameters of the box body of the sound absorbing device are determined by predetermined sound absorption coefficients and sound absorption volumes of the two Helmholtz resonators, and the structural parameters comprise plate thicknesses of the partition plate, the open end side face and the closed end side face; pipe orifice apertures and pipe lengths of the first hollow pipe and the second hollow pipe; and shapes, volumes and wall thicknesses of the first hollow cavity and the second hollow cavity.

Beneficially, the sound absorbing device integrally forms a structural resonance sound absorbing device, and serving as the structural resonance sound absorbing device, the sound absorbing device has a first-order natural mode frequency consistent with the first-order natural mode frequency of the wheel air chamber.

According to one embodiment, a plurality of sound absorbing devices are arranged side by side on the hub of the wheel to optimize or adapt to the sound absorption noise reduction requirements or its dynamic balance characteristics of the wheel as a whole. In particular, a plurality of sound absorbing devices are distributed along the circumferential direction of the hub, e.g., two cartridge sound absorbing devices arranged symmetrically along the hub circumferentially, i.e., mounted opposite to each other in the wheel diameter direction, for the specific case of a particular vehicle type.

According to one embodiment, the sound absorbing device abuts against the outer surface of the rim of the hub via the bottom surface of the box body in an installation state. In this regard, it is convenient for the sound absorbing device to be provided with at least one bend extending laterally along its box body, the bend dividing the box sound absorbing device into at least two sections in the longitudinal direction of its box body, so as to conform the bottom surface of the box body to the circular arc profile of the outer rim surface in the mounted state. The bend may be designed as a material weak part of the box body, may be continuous or non-continuous along the lateral direction of the box, and may extend through the lateral direction of the box, or may extend only over a partial section of the lateral direction of the box.

According to one embodiment, the sound absorbing device is bound and fixed on the hub of the wheel by a strap, the strap (for example, steel straps) presses the sound absorbing device on the outer surface of the rim of the hub from the top face of the box body of the sound absorbing device and wraps around the hub to fasten the sound absorbing device, the two end heads of the strap are fixedly connected by a buckle, and the tension of the strap can be adjusted and/or displayed with the aid of a fastening tool.

In this regard, the sound absorbing device is provided with a U-shaped groove for the embedment of the strap on the top face of the box body thereof.

The beneficial technical effects achieved by the present disclosure consist in particular in that a comprehensive sound absorbing structural arrangement is made up of two resonance absorbing units and integral structural resonance absorption, i.e. An organic combination of Helmholtz resonance absorption and structural resonance absorption on the wheel, resulting in a more effective sound absorption effect, which is represented in that: firstly, the sound absorption frequency band is wider; and secondly, the sound absorption capacity is higher.

BRIEF DESCRIPTION OF THE DRAWINGS

Some exemplary embodiments of the disclosure are illustrated in the accompanying drawings. The embodiments and figures disclosed herein are to be considered illustrative rather than restrictive. It is further noted that, for clarity of illustration, some structural details in the drawings are not drawn to actual scale.

Figure 1:
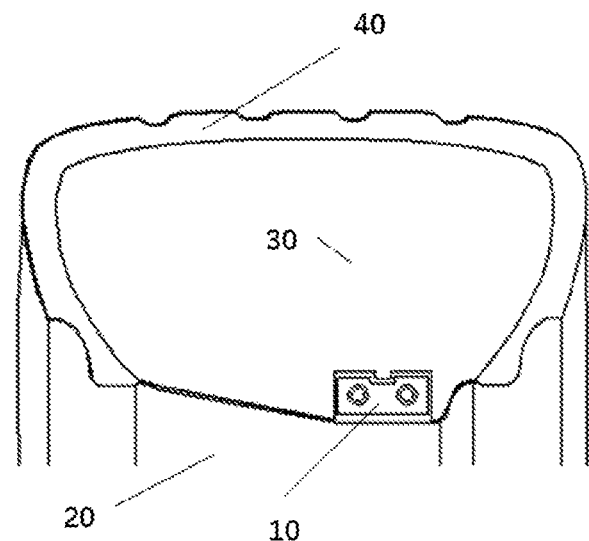
FIG. 1 is a schematic view of the mounting of a sound absorbing device on a wheel.

Among them: 1—open end side face, 1'—closed end side face, 2—second hollow cavity, 2w—first hollow tube wall, 3—first hollow cavity, 4—second hollow pipe, 4w—second hollow tube wall, 5—second hollow cavity, 6—partition plate, 7—U-shaped groove; 10—sound absorbing device, 10—1—first resonance sound absorbing structure unit, 10—2—second resonance sound absorbing structure unit, 20—hub, 30—wheel air chamber, 40—tire, 50—strap.

DETAILED DESCRIPTION

Reference will now be made to the accompanying drawings in which embodiments of the present application will be made clearly and completely, and it will be apparent that the embodiments described are some, but not all, embodiments of the present application. Based on the embodiments in the present application, all other embodiments obtained by one of ordinary skill in the art without inventive step are intended to be within the protection scope of the present application.

The terms "first", "second" and the like in the description and claims of the present application and in the drawings are used for distinguishing between different objects and not for describing a particular order. Furthermore, the terms "include" and "have", as well as any permutations thereof, are intended to cover a non-exclusive inclusion. For example, a process, method, product, or apparatus that comprises a list of steps or units is not limited to the listed steps or units but optionally also includes steps or units not listed or optionally also includes other steps or units inherent to such process, method, product, or apparatus. Those skilled in the art will appreciate that, In the description of the present specification and claims, the orientation or positional relationship indicated by the terms "longitudinal", "lateral", "upper", "lower", "front", "back", "left", "right", "vertical", "horizontal", "top", "bottom", "inner", "outer", etc., is based on the orientation or positional relationship shown in the drawings. It is merely for the purpose of facilitating the description of the disclosure and simplifying the description, and it is not intended to indicate or imply that the devices, mechanisms, structures or elements referred to must have a particular orientation, be constructed and operate in a particular orientation, and as such the terms are not to be construed as limiting the present disclosure.

Reference herein to "an embodiment" means that a particular feature, structure, or characteristic described in connection with the embodiment can be included in at least one embodiment of the application. The appearances of this phrase in various places in the specification are not necessarily all referring to the same embodiment, nor are separate or alternative embodiments mutually exclusive of other embodiments. It is explicitly and implicitly understood by those skilled in the art that the embodiments described herein may be combined with other embodiments.

The present disclosure provides a wheel having a sound absorbing device, in particular, a vehicle wheel with a pneumatic tire 40, as shown in FIG. 1, the sound absorbing device 10 is installed in a wheel air chamber 30 to reduce acoustic resonance. According to the present disclosure, the sound absorbing device comprises at least two resonance sound absorbing structure units, wherein the first sound absorbing frequency band of the first resonance sound absorbing structure unit 10-1 and the second sound absorbing frequency band of the second resonance sound absorbing structure unit 10-2 are adjacent to each other or partially overlap each other, and the resonance frequency $f_0$ of the wheel air chamber 30 is contained in the adjacent location of the first sound absorbing frequency band and the second sound absorbing frequency band or in the overlapping area of the first sound absorbing frequency band and the second sound absorbing frequency band; the sound absorbing device is constructed as a box body composed of the first resonance sound absorbing structure unit 10-1 and the second resonance sound absorbing structure unit 10-2 in parallel, and the box body is fixed on the hub 20 of the wheel (see FIGS. 2 and 3).

Figure 2:
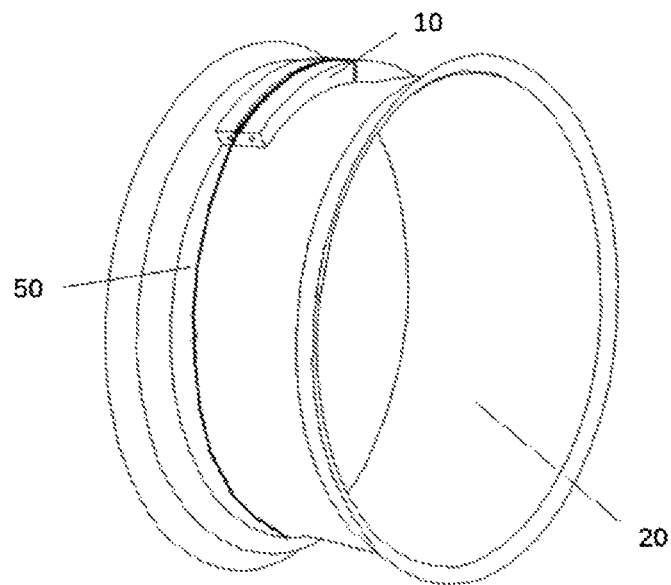
FIG. 2 is a schematic illustration of a sound absorbing device disposed on a wheel hub in accordance with a preferred embodiment.

FIG. 2 is a schematic illustration of a sound absorbing device disposed on a wheel hub in accordance with a preferred embodiment.

According to practical needs, it is possible to provide a plurality of sound absorbing devices 10 are arranged side by side on the hub 20 of the wheel, or a plurality of sound absorbing devices 10 are distributed along the circumferential direction of the hub. The sound absorbing device 10 abuts against the outer surface of the rim of the hub 20 via the bottom surface of the box body in an installation state. Conveniently, the sound absorbing device is provided with at least one bend extending laterally along its box body, the bend dividing the box sound absorbing device into at least two sections in the longitudinal direction of its box body, so as to conform the bottom surface of the box body to the circular arc profile of the outer rim surface in the mounted state. The bend may be designed as a material weak part of the box body, may be continuous or non-continuous along the lateral direction of the box, and may extend through the lateral direction of the box, or may extend only over a partial section of the lateral direction of the box.

The sound absorbing device 10 is bound and fixed on the hub 20 of the wheel by a strap 50 (e.g., a steel strap), the strap presses the sound absorbing device 10 on the outer surface of the rim of the hub from the top face of the box body of the sound absorbing device 10 and wraps around the hub 20 to fasten the sound absorbing device 10, the two end heads of the strap are fixedly connected by a buckle, and the tension of the strap can be adjusted and/or displayed with the aid of a fastening tool. Suitably, the sound absorbing device 10 is provided with a U-shaped groove 7 for the embedment of the strap on the top face of the box body thereof (see FIG. 3).

Figure 3:
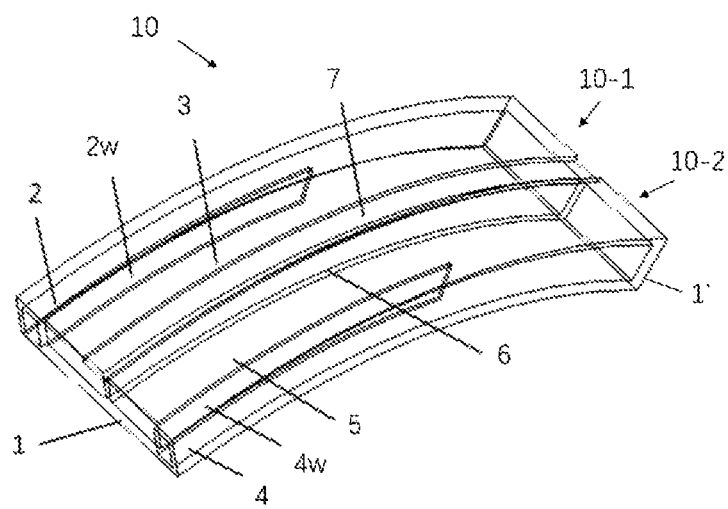
FIG. 3 is a schematic of the construction principle of the sound absorbing device.

FIG. 3 shows the general outline structure and internal construction of a single sound absorbing device. Preferably, the sound absorbing device 10 is a rectangular hexahedral box body integrally formed from plastic material and can be manufactured by a 3D printing process. In particular as shown in FIG. 3, the sound absorbing device 10 has two side faces that define the boundaries of the two ends of the box body in the circumferential direction of the hub, wherein an open end side face 1 is formed at one end and has an opening leading into a hollow cavity in the box body, and a closed end side face 1' is formed at the other end. The first resonance sound absorbing structure unit 10-1 and the second resonance sound absorbing structure unit 10-2 of the sound absorbing device 10 respectively form a uniporous Helmholtz resonator, wherein the interior of the box body is divided by a partition plate 6 extending along the circumferential direction of the wheel hub into a first hollow cavity 3 and a second hollow cavity 2, which are arranged side by side, pipe orifices of a first hollow pipe 2 and a second hollow pipe 4 are formed in the open end side face 1, the pipe orifices are open toward the wheel air chamber, and the first hollow pipe and the second hollow pipe respectively extend into the first hollow cavity 3 and the second hollow cavity 5 by distances corresponding to the pipe lengths thereof.

As described above, the sound absorption bands of the two sound absorbing structures of the sound absorbing device (i.e., the first resonance sound absorbing structure unit and the second resonance sound absorbing structure unit in parallel) are different, but are both close to (or contain) the resonance frequency of the wheel air chamber. Here, the resonance frequencies of the two Helmholtz resonators are not the same (i.e., $fr_1 \neq fr_2$), the resonance frequency $fr_1$ of the first Helmholtz resonator formed as the first resonance sound absorbing structure unit 10-1 is greater than or equal to the resonance frequency $f_0$ of the wheel air chamber 30 (i.e., $fr_1 \geq f_0$), and the resonance frequency $fr_2$ of the second Helmholtz resonator formed as the second resonance sound absorbing structure unit 10-2 is less than or equal to the resonance frequency $f_0$ of the wheel air chamber 30 (i.e., $fr_2 \leq f_0$). Suitably, the difference between the resonance frequency $fr_1$ of the first Helmholtz resonator and the resonance frequency $f_0$ of the wheel air chamber 30 is not greater than 50% of the resonance frequency of the wheel air chamber; and the difference between the resonance frequency $fr_2$ of the second Helmholtz resonator and the resonance frequency $f_0$ of the wheel air chamber 30 is not greater than 50% of the resonance frequency of the wheel air chamber.

Here, the structural parameters of the box body of the sound absorbing device 10 are determined by predetermined sound absorption coefficients and sound absorption volumes of the two Helmholtz resonators, and the structural parameters comprise plate thicknesses of the partition plate 6, the open end side face 1 and the closed end side face 1'; pipe orifice aperture and pipe length of each hollow pipe; and shapes, volumes and wall thicknesses of the first hollow cavity 3 and the second hollow cavity 5.

According to the present disclosure, it is beneficial that the sound absorbing device 10 integrally forms a structural resonance sound absorbing device, and serving as the structural resonance sound absorbing device, the sound absorbing device has a first-order natural mode frequency consistent with the first-order natural mode frequency of the wheel air chamber 30. This will also be explained further below.

In particular, FIG. 3 shows a schematic diagram of the construction principle of the sound absorbing device of the present disclosure. According to this preferred embodiment, the sound absorbing device is embodied as a rectangular hexahedral box structure processed by injection molding, the interior of the box structure is divided into two cavities, namely a first hollow cavity 3 and a second hollow cavity 5, by a layer of thin plate (i.e., a partition plate 6, which is mutually perpendicular to the face to which it is connected). On one side of the box structure (i.e., the open end side face perpendicular to the partition plate) two hollow tube walls (first hollow tube wall 2*w* and second hollow tube wall 4*w*, respectively) extending towards the inside of the box body are provided, together with the cavity walls forming a first hollow pipe 2 and a second hollow pipe 4, the first hollow pipe 2 communicating with the first hollow cavity 3, and the second hollow pipe 4 communicating with the second hollow cavity 5. The plane of the nozzle at one end of the hollow pipe and the side surface (i.e., open end side 1) of the box body are on one surface, and the first and second hollow pipe sections 2 and 4 can have different pipe orifice diameters or pipe orifice cross-sectional areas. The tube extends into the cavity, first and second hollow pipe 2, 4 may have different tube lengths. First and second hollow pipe 2 and 4 are in communication with the tire air chamber (so-called wheel air chamber) and the box structure is mounted integrally on the hub circular arc circumference forming a parallel Helmholtz resonant sound absorbing structure. This configuration has a wider frequency band of absorption compared to single-cavity single-hole Helmholtz resonance absorption. The relevant parameters of the structural configuration are determined using the sound absorption coefficient and sound absorption capacity of the Helmholtz resonance sound absorbing structure.

The box structure is preferably made of a plastic material having certain stiffness and strength, is tightly clinging to the peripheral surface of the hub circular arc, and is fixedly mounted by means of steel straps. In the parallel Helmholtz resonant acoustic absorbing structure in this installation, the two first-order natural mode frequencies are separated and close to the first-order natural mode frequency of wheel air chamber to extend the acoustic noise-reduction band.

The natural mode of the structure meets design requirements by plate thickness and shape adjustments that need to be achieved by finite element calculations. Its design may further increase the sound absorption capacity of the above resonant sound absorbing structure on the one hand, and may also further increase the sound absorption bandwidth by design.

Such a box's sound absorbing device is designed with a U-shaped groove on its upper surface, and the box structure has a circular arc shape and is mounted by passing through the U-shaped groove with a steel strap and fixed around the hub. According to practical needs and specific design situations, it is also possible to arrange a plurality of box-type sound absorbing structures on the hub, with the steel strap holding several box-type sound absorbing structures on the hub together a circuit around the hub. The steel strap connections are fastened with snaps and the fastening force can be displayed with a fastening tool to judge how strong the installation is.

The relevant parameters for the rectangular hexahedral box structure shown in FIG. 3 is determined using the sound absorption coefficient and sound absorption capacity of the Helmholtz resonance sound absorbing structure as described in the following equation:

Provided Z is the surface acoustic impedance of the resonant structure, Zp is the acoustic impedance of the hole of the perforated structure and Za is the acoustic impedance of the cavity. Zp and Za are calculated according to Equation (1) and Equation (2), and then Z is calculated according to Equation (3) and the sound absorption coefficient is calculated according to Equation (4).

$$Z_p = \frac{\rho}{\delta}\sqrt{8\gamma\omega}\left(1+\frac{t}{d}\right)+ \tag{1}$$
$$j\frac{\omega\rho}{\delta}\left[\sqrt{\frac{8\gamma}{\omega}}\left(1+\frac{t}{d}\right)+t+0.85d\left(1-1.47\sqrt{\delta}+0.47\sqrt{\delta^3}\right)\right]$$

$$Z_a = -j\rho c \cot\left(\frac{\omega D}{c}\right) \tag{2}$$

$$Z = Z_p + Z_a \tag{3}$$

$$Z_r = \frac{Z}{\rho c}$$

Wherein ρ is the air density, c is the air sound speed, ω=2πf, f is the frequency, γ is the air motion viscosity coefficient, γ=1.53*10$^{-5}$ m$^2$/s, t is the thickness of the plate, d is the pore size, δ is the perforation rate of the plate, and D is the thickness of the cavity. Zr is the relative acoustic impedance of the resonant structure.

Let R be the real part of Zr and X be the imaginary part of Zr, the sound absorption coefficient of the resonant sound absorbing structure be:

$$\alpha = \frac{4R}{(R+1)^2 + (X+1)^2} \tag{4}$$

The resonant frequency fr of the perforated panel can be calculated as in equation (5):

$$f_r = \frac{c}{2\pi}\sqrt{\frac{S}{(t+0.8d)D}} \tag{5}$$

The sound absorption capacity calculation formula:

$$A = \alpha S \tag{6}$$

Wherein: A is the sound absorption capacity of the resonant sound absorbing structure.

S is the cross-sectional area of the resonant sound absorbing structured hollow tube 2/hollow tube 4.

FIG. 3 shows a rectangular hexahedral box structure as a resonant sound absorbing structure which a first-order natural mode frequency consistent with the first-order natural mode frequency of the wheel air chamber. Its natural frequency reaches the design requirement by plate thickness and shape adjustment, which needs to be achieved by finite element calculations.

As shown in FIG. 3, the upper surface of the resonant sound absorbing structure is designed with a U-shaped groove 7 in order to mount it on the hub 20 shown in FIG. 2. As shown in FIGS. 1 and 2, a steel strap is passed as a strap 50 and embedded in a U-shaped groove 7 to secure it by pressing the resonant sound absorbing structure against the hub for a circuit around the hub. A steel strap 3 around the hub may secure one or more sound absorbing structures on the hub. The steel strap connections are fastened with snaps and the fastening force can be displayed with a fastening tool to judge how strong the installation is.

Figure 4:
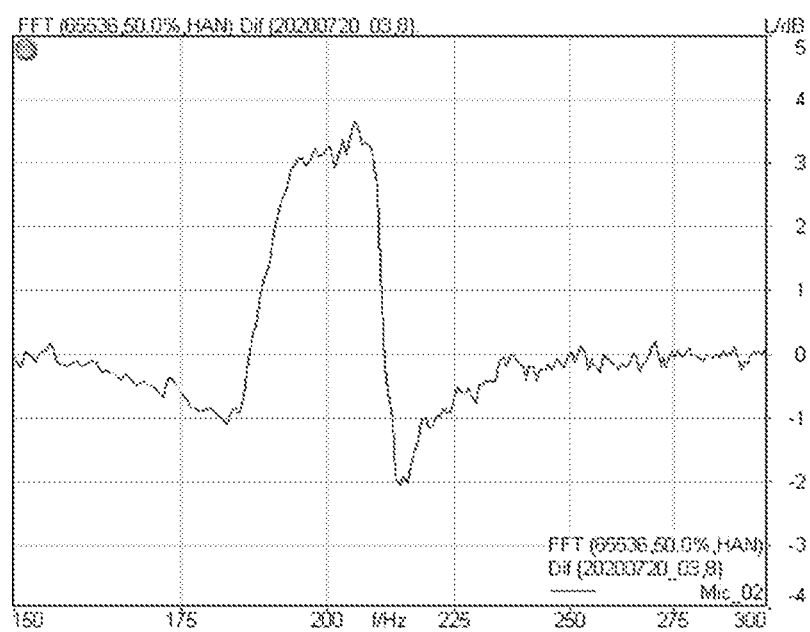
FIG. 4 is a graph showing the amount of noise reduction measured using a test platform to simulate wheel/tire conditions under vehicle travel in an example of application.

FIG. 4 is a graph showing the amount of noise reduction measured using a test platform to simulate wheel/tire conditions under vehicle travel in an example of application.

In an application example test, aiming at the deformation geometric dimension of an air chamber of a certain type of vehicle in a driving state, the natural frequency of the air chamber is calculated by utilizing certain commercial software, and aiming at the frequency, the geometric dimensions and the sound absorption performances of the resonance sound absorption structure of sound absorption device shown in FIG. 3 are designed and debugged according to formulas (1) to (6). In this example, the sound absorption device with the corresponding resonance sound absorption structure is manufactured by adopting plastic materials and utilizing a 3D printing means, and one of the resonant sound absorbing devices is mounted on a test platform for sound absorption noise reduction testing. The test platform is formed according to the outer shape of the tire and the shape of the air chamber of the tire in a driving state. The speakers mounted on their walls emit acoustic signals to form an acoustic field in the air chamber, the speakers mounted on the walls can detect the size of the acoustic field in the air chamber, and the sound absorbing device can be mounted in an actual configuration in the air chamber. The noise reduction effect of the sound absorbing device is evaluated by measuring the magnitude of the sound pressure level collected on the wall surface before and after the mounting of the sound absorbing device. According to the present evaluation method, the noise reduction effect of the sound absorbing device is evaluated by using the difference between the sound pressure levels obtained after two measurements at the frequency band of interest.

As can be seen in FIG. 4, around the natural frequency of the tyre air chamber 200 Hz, the noise reduction effect of the resonant sound absorbing structure of the present disclosure is evident, with the maximum noise reduction of 3.7 dB being achieved with one resonant absorbing device, and the noise reduction bandwidth exceeding 20 Hz. A real car may use more such resonance absorbing devices and the amount of effective noise reduction will be greater.

The embodiments are described in detail above, and specific examples are applied herein to explain the principles and embodiments of the present application, and the description of the embodiments is only used to help understand the core idea of the present application; meanwhile, for a person skilled in the art, according to the idea of the present application, the specific implementation and the application scope may be changed, and in summary, the content of the present specification should not be construed as a limitation to the present application.

What is claimed is:

1. A wheel with a sound absorbing device, the sound absorbing device being installed in a wheel air chamber to reduce acoustic resonance, wherein the sound absorbing device comprises at least two resonance sound absorbing structure units, wherein the first sound absorbing frequency band of the first resonance sound absorbing structure unit and the second sound absorbing frequency band of the second resonance sound absorbing structure unit are adjacent to each other or partially overlap each other, and the resonance frequency of the wheel air chamber is contained in the adjacent location of the first sound absorbing frequency band and the second sound absorbing frequency band or in the overlapping area of the first sound absorbing frequency band and the second sound absorbing frequency band; the sound absorbing device is constructed as a box body composed of the first resonance sound absorbing structure unit and the second resonance sound absorbing structure unit in parallel, and the box body is fixed on the hub of the wheel, wherein the sound absorbing device integrally forms a structural resonance sound absorbing device, and serving as the structural resonance sound absorbing device, the sound absorbing device has a first-order natural mode frequency consistent with the first-order natural mode frequency of the wheel air chamber, wherein the sound absorbing device has two side faces that define the boundaries of the two ends of the box body in the circumferential direction of the hub, wherein an open end side face is formed at one end and has an opening leading into a hollow cavity in the box body, and a closed end side face is formed at the other end, and wherein the first resonance sound absorbing structure unit and the second resonance sound absorbing structure unit of the sound absorbing device respectively form an uniporous Helmholtz resonator, wherein the interior of the box body is divided by a partition plate extending along the circumferential direction of the wheel hub into a first hollow cavity and a second hollow cavity, which are arranged side by side, pipe orifices of a first hollow pipe and a second hollow pipe are formed in the open end side face, the pipe orifices are open toward the wheel air chamber, and the first hollow pipe and the second hollow pipe respectively extend into the first hollow cavity and the second hollow cavity by distances corresponding to the pipe lengths thereof;

and wherein the resonance frequencies of the two Helmholtz resonators are not the same, the resonance frequency of the first Helmholtz resonator formed as the first resonance sound absorbing structure unit is greater than or equal to the resonance frequency of the wheel air chamber, and the resonance frequency of the second Helmholtz resonator formed as the second resonance sound absorbing structure unit is less than the resonance frequency of the wheel air chamber.

2. The wheel according to claim 1, wherein the sound absorbing device is a rectangular hexahedral box body integrally formed from metal material or plastic material.

3. The wheel according to claim 1, wherein the sound absorbing device is a rectangular hexahedral box body made by 3D printing process.

4. The wheel according to claim 1, wherein the difference between the resonance frequency of the first Helmholtz resonator and the resonance frequency of the wheel air chamber is not greater than 50% of the resonance frequency of the wheel air chamber; and the difference between the resonance frequency of the second Helmholtz resonator and the resonance frequency of the wheel air chamber is not greater than 50% of the resonance frequency of the wheel air chamber.

5. The wheel according to claim 1, wherein structural parameters of the box body of the sound absorbing device are determined by predetermined sound absorption coefficients and sound absorption volumes of the two Helmholtz resonators, and the structural parameters comprise plate thicknesses of the partition plate, the open end side face and the closed end side face; pipe orifice apertures and pipe lengths of the first hollow pipe and the second hollow pipe; and shapes, volumes and wall thicknesses of the first hollow cavity and the second hollow cavity.

6. The wheel according to claim 1, wherein a plurality of sound absorbing devices are arranged side by side on the hub of the wheel, or a plurality of sound absorbing devices are distributed along the circumferential direction of the hub.

7. The wheel according to claim 1, wherein the sound absorbing device abuts against the outer surface of the rim of the hub via the bottom surface of the box body in an installation state.

8. The wheel according to claim 1, wherein the sound absorbing device is bound and fixed on the hub of the wheel by a strap, the strap presses the sound absorbing device on the outer surface of the rim of the hub from the top face of the box body of the sound absorbing device and wraps around the hub to fasten the sound absorbing device, the two end heads of the strap are fixedly connected by a buckle, and the tension of the strap can be adjusted and/or displayed with the aid of a fastening tool.

9. The wheel according to claim 8, wherein the sound absorbing device is provided with a U-shaped groove for the embedment of the strap on the top face of the box body thereof.

* * * * *